United States Patent [19]

Molinatto

[11] Patent Number: 4,612,692
[45] Date of Patent: Sep. 23, 1986

[54] PRESSURE CYLINDER WITH VARIABLE CONFIGURATION AXIS

[75] Inventor: Bruno Molinatto, Montalto Dora, Italy

[73] Assignee: Componenti Grafici s.r.l., Candia Lomellina, Italy

[21] Appl. No.: 567,351

[22] Filed: Dec. 30, 1983

Related U.S. Application Data

[63] Continuation of Ser. No. 268,473, May 29, 1981, abandoned.

[30] Foreign Application Priority Data

Jun. 19, 1980 [IT] Italy ................................ 67958 A/80

[51] Int. Cl.⁴ .............................................. B21B 13/02
[52] U.S. Cl. ............................. 29/116 AD; 100/162 B
[58] Field of Search .............. 100/162 B; 29/116 AD, 29/113 AD, 116 R, 113 R

[56] References Cited

U.S. PATENT DOCUMENTS

| | | | |
|---|---|---|---|
| 2,625,338 | 1/1953 | McArn | 29/113 R |
| 3,043,211 | 7/1962 | Appenzeller | 100/170 |
| 3,050,829 | 8/1962 | Appenzeller | 29/113 AD |
| 3,225,418 | 12/1965 | Fara | 29/113 AD |
| 3,638,292 | 2/1972 | Gaghan | 29/116 AD X |
| 3,854,646 | 12/1974 | Dörfel et al. | 29/116 AD X |
| 4,214,354 | 7/1980 | Lehmann | 29/116 |

FOREIGN PATENT DOCUMENTS

| | | | |
|---|---|---|---|
| 1146022 | 3/1963 | Fed. Rep. of Germany | 29/113 AD |
| 39-23797 | 10/1964 | Japan | 100/162 B |
| 893426 | 4/1962 | United Kingdom | 29/116 AD |

OTHER PUBLICATIONS

German Publication No. 29 48 445, Rose et al., Jun. 19, 1980.

Primary Examiner—Howard N. Goldberg
Assistant Examiner—Timothy V. Eley
Attorney, Agent, or Firm—Webb, Burden, Robinson & Webb

[57] ABSTRACT

A pressure cylinder in which an outer tubular roll is rotatably supported at its ends by a central shaft passing therethrough. The central portion of the shaft engages with radial play in a tubular bush disposed within the outer roll and rotatably supported thereon. A bladder having a variable volume is interposed between the bush and the shaft and extends circumferentially about the shaft over an arc less than 180°.

4 Claims, 4 Drawing Figures

PRESSURE CYLINDER WITH VARIABLE CONFIGURATION AXIS

This is a continuation of U.S. application Ser. No. 268,473, filed May 29, 1981, now abandoned.

BACKGROUND OF THE INVENTION

The present invention relates to a pressure cylinder with a variable configuration axis.

In particular, the present invention relates to a pressure cylinder which can be used in contact with a movable supporting surface, generally a cylindrical surface, for imparting to this latter a determined pressure distributed in a substantially uniform manner along a line of contact.

The formation of a pressure cylinder of the type described above does not, in general, present any problem in cases in which the said line of contact is of relatively short length. In this case, in fact, the deflection of the axis of the pressure cylinder and, therefore, of the said line contact, is substantially nil and, in any case, not such as to afford significant variations in pressure from point to point along the said line of contact.

The situation is considerably complicated if the said line of contact has a relatively great length since, in this case, both the deflection of the cylinder under its own weight, and the deflection of the said contact surface, afford an imperfect contact between this latter and the pressure cylinder. Consequently, the contact pressure is not uniformily distributed along the said line of contact, but varies from point to point along this, normally according to a complex law having a minimum at mid point of the pressure cylinder. When it is required that this minimum be above a certain value, it becomes necessary to apply to the cylinder a pressure corresponding to a mean pressure value along the said contact line which is many times greater than the value of the said minimum.

SUMMARY OF THE INVENTION

The object of the present invention is that of providing a pressure cylinder the line of contact of which can have imparted to it a deformation similar to that of the associated contact surface independently of the forces which the said surface and the said cylinder exert on one another during contact.

More generally, the object of the present invention is that of providing a pressure cylinder the configuration of which can be varied at will independently of the externally applied forces on the cylinder.

The said object is achieved by the present invention in that it relates to a pressure cylinder characterised by the fact that it comprises, in combination, a central shaft; a hollow outer roll traversed by the said shaft and rotatably supported at the ends of this latter; a bush mounted with radial play on an intermediate portion of the said shaft and within the said roll, the said bush being axially and angularly fixed with respect to the said shaft and being coupled in a rotatable manner to an intermediate portion of the said roll; and deformable chamber means which can be dilated under the thrust of a fluid under pressure and interposed between the said bush and the said shaft; the said deformable means preferably extending circumferentially over an arc less than 180°.

BRIEF DESCRIPTION OF THE DRAWINGS

Further characteristics and advantages of the present invention will become apparent from the following description with reference to the attached drawings, which illustrate a non-limitative embodiment of it, and in which:

FIGS. 2 and 3 illustrate, on an enlarged scale, and in axial section, two details of FIG. 1; and FIG. 4 is a section taken on the line IV—IV of FIG. 1.

DETAILED DESCRIPTION OF THE INVENTION

Figure 1:
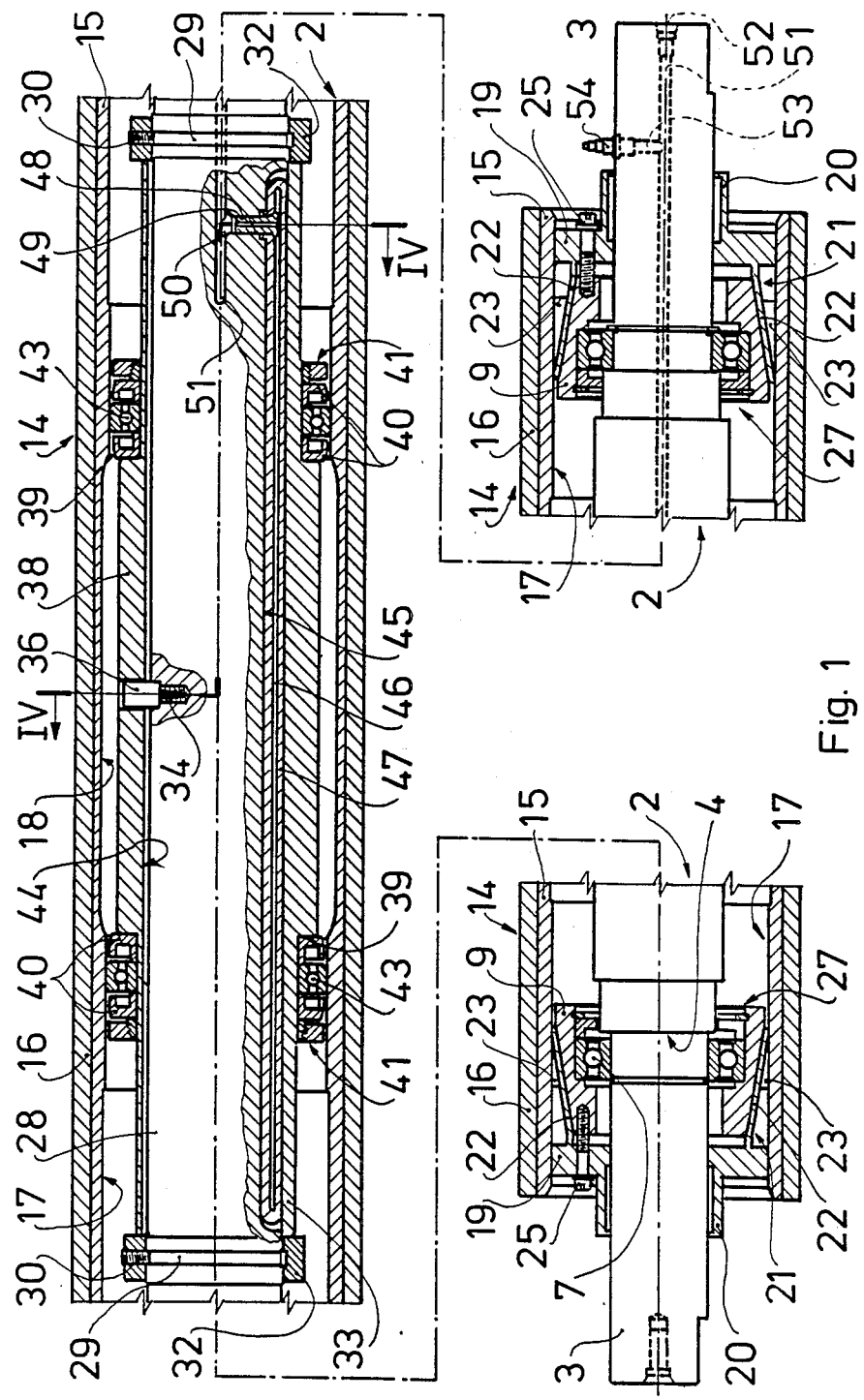
FIG. 1 is an axial section of a pressure cylinder formed according to the principles of the present invention.

In FIG. 1 there is illustrated a pressure cylinder generally indicated 1 and including a substantially cylindrical central shaft 2, two opposite end portions 3 of which are connectable to supports, not illustrated, for support of the cylinder 1.

Figures 2, 4:
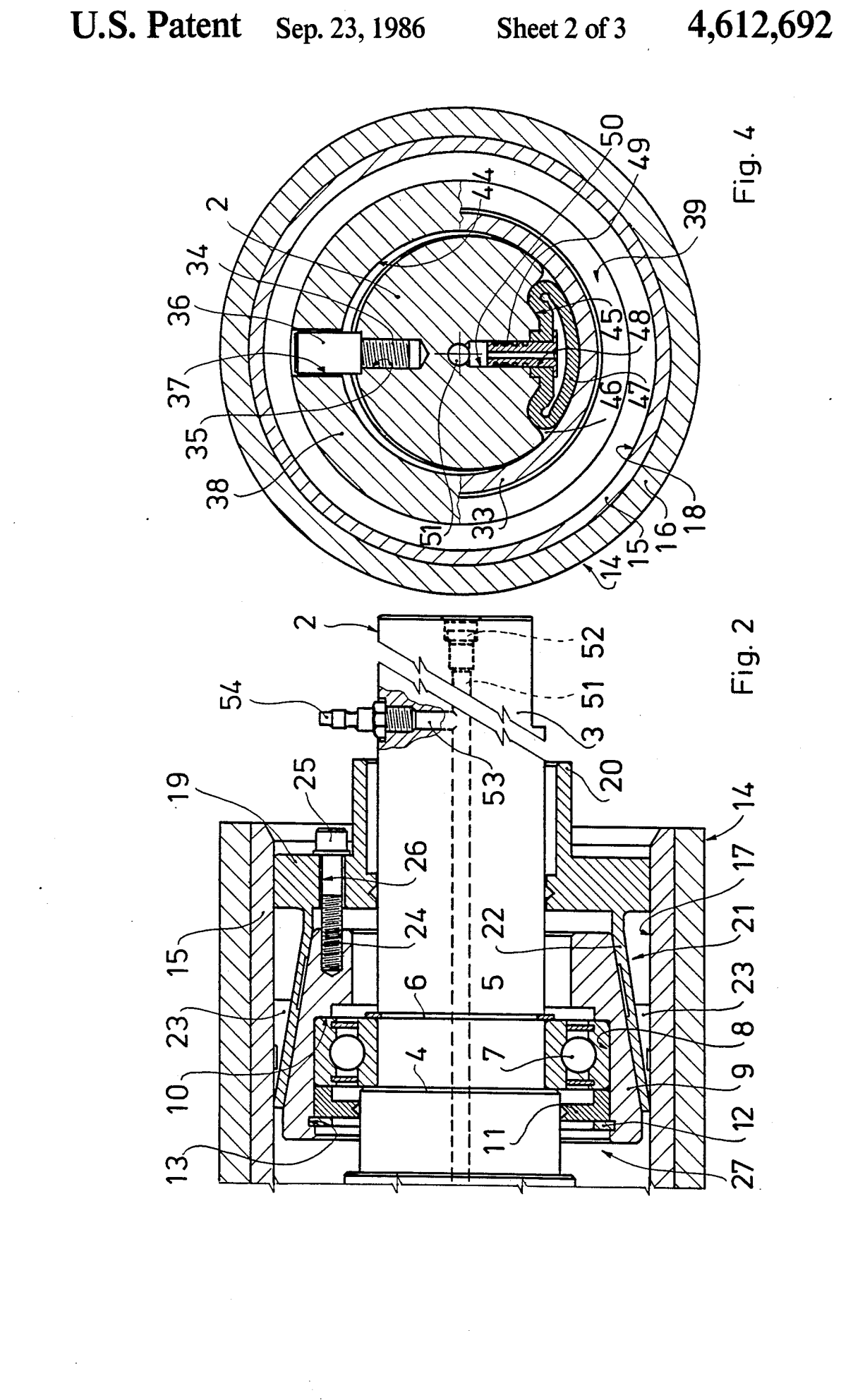

As illustrated, in particular in FIG. 2, each portion 3 has an annular shoulder 4 against which there is axially fixed, by means of a circlip 5 housed within an annular groove 6 formed on the portion 3 outwardly of the shoulder 4, the inner ring of a radial bearing 7. The outer ring of radial bearing 7 contacts an inner cylindrical surface 8 of a frusto-conical body 9. The said outer ring is axially locked on the surface 8 against an annular shoulder 10 of this latter by means of an oil seal spacer 11 axially locked against the outer ring of the bearing 7 by means of a circlip 12 housed within an annular groove 13 formed on the surface 8 inwardly of the shoulder 10.

With the exception of its end portions 3, the shaft 2 extends within a cylindrical roll 14 comprising an inner cylindrical tubular jacket 15 preferably constituted of metal material, and a tubular sleeve 16 preferably made of resilient material and fitted onto the jacet 15. This latter has an inner cylindrical surface 17 provided with a central recessed portion 18 and coupled, at each of its ends, to the outer cylindrical surface of an annular flange 19 which extends radially outwardly from a tubular sleeve 20 coaxial with the shaft 2 and traversed by this latter. Each flange 19 is disposed outwardly of an associated frusto-conical body 9 in a position facing the smaller annular end thereof, and constitutes the bottom wall of a cup-shape body 21 the side wall of which is constituted by a plurality of resilient blades 22 each provided with an outer skid 23 and extending along the outer surface of the body 9. This latter has, on its smaller annular end, a plurality of threaded blind axial holes 24 engaged by the threaded ends of respective screws 25 lodged within respective through holes 26 passing axially through the flange 19.

Each cup-shape body 21 and its associated body 9 constitute, together with the associated bearings 7, a double wedge support and axial locking device 27 for the roller 14 on the shaft 2. By means of the tension of the screws 25 it is, in fact, possible to cause progressive engagement of the body 9 within the body 21 causing an outward deflection of the blades 22 and the forced coupling of the skids 23 of these against the inner surface 17 of the jacket 15 of the roller 14, which latter can rotate freely on the shaft 2 because of the presence of the bearings 7.

Figure 3:
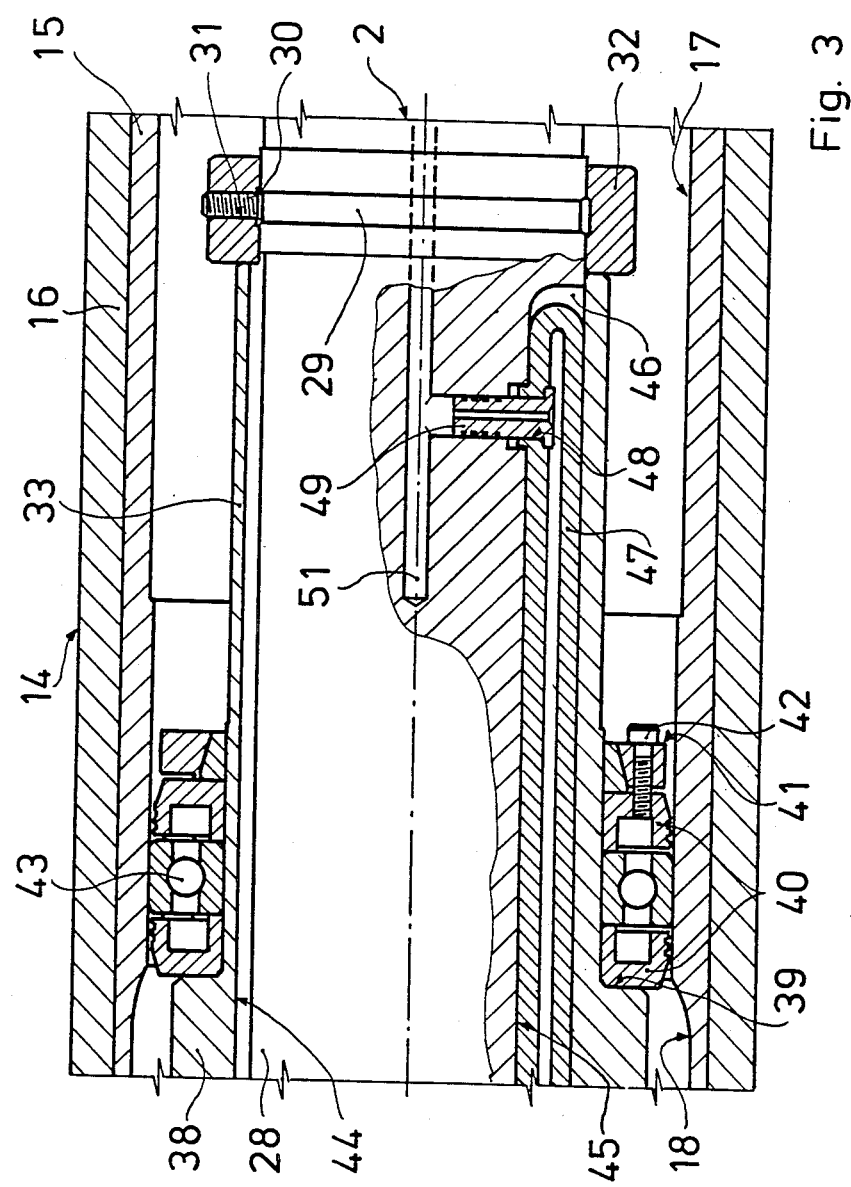

As illustrated in FIG. 1 and, in particular, in FIG. 3, the shaft 2 has a central intermediate portion 28 delimited by two annular grooves 29 which are engaged by the ends of a plurality of threaded dowels 30 lodged within respective holes 31 passing radially through two rings 32 mounted on the shaft 2 for axially fixing, with respect to this latter, a substantially cylindrical bush 33 traversed by the shaft 2 and extending between the rings 32.

The bush 33 is angularly fixed with respect to the shaft 2 by means of a radial pin 34 (FIG. 4) a threaded shank of which engages in a radial hole 35 formed centrally on the shaft 2, and a head 36 of which engages slidably in a radial hole 37 formed centrally through the bush 33. This latter has a central portion 38 of enlarged thickness limited by two outer annular shoulders 39 against each of which there is locked, by means of two oil seal rings 40 and a double wedge locking device 41 provided with locking screws 42, the inner ring of a radial bearing 43. The outer ring of radial bearing 43 slidably engages the surface 17 of jacket 15. The bearings 43 are located on opposite hands outwardly of the recessed portion 18 of the surface 17 and slidably support the bush 33 on the roll 14.

As illustrated, in particular in FIGS. 3 and 4, the bush 33 has an axial bore 44 engaged with radial play by the shaft 2 and eccentrically disposed with respect to this latter. In particular, in the rest position, the shaft 2 is disposed with its lower generatrix in contact with the internal surface of the bore 44 and with its upper generatrix at a certain distance from the upper generatrix of the bore 44.

As illustrated in particular in FIG. 4, the shaft 2 has, along its intermediate portion 28, an axial groove 45 the axis of which substantially coincides with the said lower generatrix of the shaft 2. The groove 45 defines, together with the surface of the bore 44 facing it, and elongate chamber 46 extending transversely about the shaft 2 over an arc which, in the example illustrated, is in the region of 45°, but which can be increased up to a maximum of 180°. The chamber 46 is occupied by a tubular body of elastomeric material defining a deformable bladder 47 which has an inlet hole 48 into which is inserted a tubular inlet coupling or union 49. This latter projects out from the bladder 47 and engages with a fluid tight seal in a radial hole 50 formed in the shaft 2 on the bottom of the groove 45 and communicating with an axial hole 51 passing through the shaft 2 from an end surface of one of the portions 3 where it is closed by a plug 52 (FIG. 2). On the said portion 3, outwardly of the associated sleeve 20, there is formed a radial hole 53 communicating with the hole 51 and having an outer threaded section within which there is mounted the threaded end of a coupling 54 for a pressure fluid supply duct (not illustrated).

In use, by supplying fluid under pressure to the interior of the bladder 47 through the holes 50 and 51 and the coupling 49, an expansion of the bladder 47 is caused, which transmits to the bush 33 a first radial force parallel to the axis of the pin 34 and directed inwardly, and to the central portion 28 of the shaft 2 a second radial force equal and opposite to the said first force.

The application of the said two radial forces causes a variation in the volume of the chamber 46 which is converted into a radial displacement of the bush 33 with respect to the shaft 2. This displacement is transmitted, through the bearings 43, to the central portion of the roll 14 which, being rigidly connected transversely to the shaft 2 at its ends because of the presence of the devices 27, deflects centrally with respect to the shaft 2 assuming a deformed configuration dependent on the pressure of the fluid supplied to the interior of the bladder 47. Obviously this deformation of the roll 14 is accompanied by a corresponding deformation in the opposite sense of the shaft 2, made possible by the presence of the radial play between the outer surface of the portion 28 of the shaft 2 and the inner surface of the bore 44.

By varying the pressure of the fluid supplied to the bladder 47 it is therefore possible to vary the configuration of the axis of the roll 14 in such a way as to make it coincide substantially with that of the roll (not illustrated) with which the roll 14 is in contac.

While a preferred embodiment of the invention has been described herein, it is to be understood that it may be embodied within the scope of the appended claims.

I claim:

1. A printing machine cylinder (1) comprising a stationary central shaft (2) having an intermediate portion (28) and end portions (3); a hollow outer roll (14) surrounding and spaced from said central shaft (2), first bearing means (7) on said end portions of said central shaft rotatably supporting said outer roll on said central shaft; said hollow outer roll having an inner tubular jacket (15) having its inner cylindrical surface (17) formed with a recessed central portion (18), a resilient tubular sleeve (16) surrounding and in contact with the exterior surface of said inner tubular jacket; a bush (33) having an eccentric axial bore (44) mounted with radial play on said intermediate portion (28) of said central shaft (2) and within said hollow outer roll (14), said bush having a central portion (38) with an enlarged diameter relative to its ends, means axially and angularly fixing said bush (33) with respect to the said central shaft (2) so that said enlarged diameter central portion is radially aligned with said recessed central portion on the inner cylindrical surface of said outer roll, bearings means (43) between the outer surface of said bush (33) and inner cylindrical surface (17) of said hollow outer roll (14), said second bearing means being located at the ends of said enlarged diameter central portion of said bush and said recessed central portion on the inner cylindrical surface of said hollow outer roll; and deformable means (47) which can be dilated by a pressurized fluid interposed between said bush (33) and said shaft (2).

2. A printing machine cylinder according to claim 1 wherein said deformable means (44) extends circumferentially about said central shaft (2) over an arc no greater than about 180°.

3. A printing machine cylinder according to claim 1 wherein said intermediate portion (28) of said central shaft (2) and said bush (33) together define an elongated chamber (46) the axis of which substantially coincides with the generatrix of said central shaft (2) and said chamber (46) contains said deformable means (47).

4. A printing machine cylinder according to claim 3 wherein said chamber (46) is partially defined by an axial groove (45) formed along said intermediate portion (28) of said central shaft (2).

* * * * *